United States Patent [19]
Spencer et al.

[11] Patent Number: 5,975,417
[45] Date of Patent: Nov. 2, 1999

[54] CONVERTIBLE BARCODE SCANNER

[75] Inventors: Michael A. Spencer, Suwanee; Rex A. Aleshire, Buford; Donald A. Collins, Jr., Lawrenceville, all of Ga.

[73] Assignee: NCR Corporation, Dayton, Ohio

[21] Appl. No.: 08/994,784

[22] Filed: Dec. 19, 1997

[51] Int. Cl.⁶ .................................................. G06K 7/10
[52] U.S. Cl. ................................ 235/462.36; 235/462.38
[58] Field of Search ........................... 235/462.38, 462.36

[56] References Cited

U.S. PATENT DOCUMENTS

| | | | |
|---|---|---|---|
| 4,647,143 | 3/1987 | Yamazaki et al. | 350/3.71 |
| 4,794,240 | 12/1988 | Schorr et al. | 235/467 |
| 4,848,862 | 7/1989 | Yamazaki et al. | 350/3.71 |
| 5,026,975 | 6/1991 | Guber et al. | 235/462 |
| 5,115,333 | 5/1992 | Mergenthaler et al. | 359/196 |
| 5,132,524 | 7/1992 | Singh et al. | 235/467 |
| 5,591,954 | 1/1997 | Spencer et al. | 235/467 |
| 5,610,385 | 3/1997 | He et al. | 235/467 |
| 5,637,852 | 6/1997 | Knowles et al. | 235/462 |
| 5,637,856 | 6/1997 | Bridgelall et al. | 235/472 |
| 5,689,102 | 11/1997 | Schonenberg et al. | 235/467 |

*Primary Examiner*—Donald Hajec
*Assistant Examiner*—Daniel Sherr
*Attorney, Agent, or Firm*—Francis L. Conte

[57] ABSTRACT

A convertible barcode scanner includes a housing in which are disposed a laser, spinner, and plurality of pattern mirrors optically aligned with the spinner for reflecting a beam from the laser to produce a first pattern of scan lines out a window at a first exit angle. A conversion mount adjustably supports a diverting one of the pattern mirrors in different tilt orientations for changing reflection angle thereon and correspondingly changing at least one of the scan lines from the first exit angle to a different exit angle.

20 Claims, 5 Drawing Sheets

CONVERTIBLE BARCODE SCANNER

BACKGROUND OF THE INVENTION

The present invention relates generally to barcode scanners, and, more specifically, to different orientations thereof.

In one type of conventional barcode scanner, a laser, multi-faceted spinner, and a plurality of pattern mirrors are mounted inside a housing. A deflecting mirror is optically aligned between the laser and the spinner for directing a laser beam from the laser against the rotating spinner facets which in turn reflect the beam forwardly onto the pattern mirrors which produce a plurality of scan lines in a typically intersecting pattern for each revolution of the spinner.

The scan pattern is projected through a window toward a barcode typically found on the label of a consumer product, for example. The scan beam is reflected from the barcode with varying intensity due to the light and dark lines of the code which may then be decoded. The return beam passes through the scanner window in a reverse path along the pattern mirrors and spinner and is then reflected off a collection mirror, which typically surrounds the deflecting mirror, which focuses the return beam onto a suitable photodetector. An electrical processor is joined to the detector for decoding the return beam from the barcode in a suitable manner.

But for the spinner whose facets rotate during operation, the other mirrors of the scanner are stationary in a fixed interrelationship for producing the desired scan pattern. The scan pattern typically includes groups of parallel intersecting scan lines covering a useful area of projection over a barcode presented therein. The desired exit angle of the scan pattern through the scanner window is dependent upon the scanner application.

In one application, the scanner window is mounted horizontally and flush in the surface of a counter in a pass-through scanner configuration. This configuration is typically found in supermarkets which allows a clerk to pass individual products over the window for decoding the barcodes thereon. In this configuration, the exit angle of one of the scan lines at the midpoint of the scan pattern is about 45° from the window in the upstream direction from which the products are presented. The remainder of the scan pattern spreads plus and minus a few degrees from the nominal 45° exit angle. In this way, maximum accuracy in decoding presented barcodes is obtained.

However, in another typical application the scanner window is mounted vertically or normal to the top of the counter in a presentation scanner configuration. The midpoint scan pattern exit angle is preferably closer to 90° which is perpendicular to the scanner window and generally parallel to the countertop. The scan pattern also has a suitable spread of several degrees plus and/or minus. In a presentation scanner, a product including a barcode is presented in front of the vertical window for decoding.

In view of the different horizontal and vertical applications of barcode scanners, different exit angles for the scan beams are required, which in turn requires a correspondingly different fixed orientation of the pattern mirrors inside the scanner. Different scanner models must therefore be manufactured which correspondingly increases associated costs of manufacture and use depending upon the required application.

In one compromise for providing a dual purpose barcode scanner, a scanner specifically configured for the horizontal, pass-through application may be simply converted to the vertical presentation application by the use of a simple change in mounting fixtures therefor. However, the exit angle of the scan pattern remains the same, for example 45° to the window, even though the window is mounted vertically instead of horizontally. This decreases the efficiency of presenting barcodes in front of the window, since 90° is considered optimal.

An example of such dual use barcode scanner has been commercially available for many years from the NCR Corporation of Ohio under the basic model 7880, with suitable mounting kits being provided therefor for use in the pass-through or presentation applications. The basic configuration of the NCR model 7880 barcode scanner is disclosed in U.S. Pat. No. 5,591,954. In this model, eight pattern mirrors are symmetrically mounted adjacent to a four-faceted spinner for producing a corresponding scan pattern with a mid-point scan pattern exit angle of about 45° with a corresponding spread of plus or minus several degrees relative thereto.

It is desired to improve this basic barcode scanner for dual use in either pass-through or presentation type scanner applications, with an improved scan pattern exit angle in the presentation configuration.

SUMMARY OF THE INVENTION

A convertible barcode scanner includes a housing in which are disposed a laser, spinner, and plurality of pattern mirrors optically aligned with the spinner for reflecting a beam from the laser to produce a first pattern of scan lines out a window at a first exit angle. A conversion mount adjustably supports a diverting one of the pattern mirrors in different tilt orientations for changing reflection angle thereon and correspondingly changing at least one of the scan lines from the first exit angle to a different exit angle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
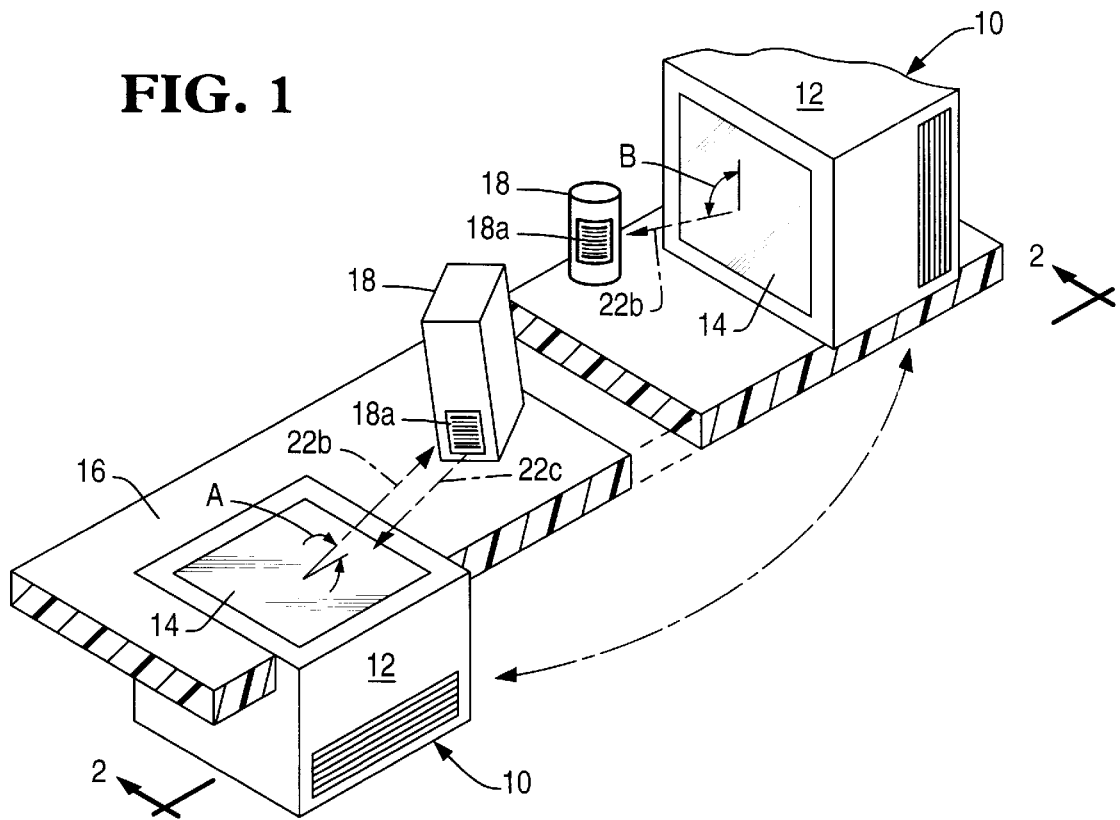
FIG. 1 is an isometric view of a convertible barcode scanner in accordance with an exemplary embodiment of the present invention which may be mounted with its window positioned horizontally or vertically.
Figure 2:
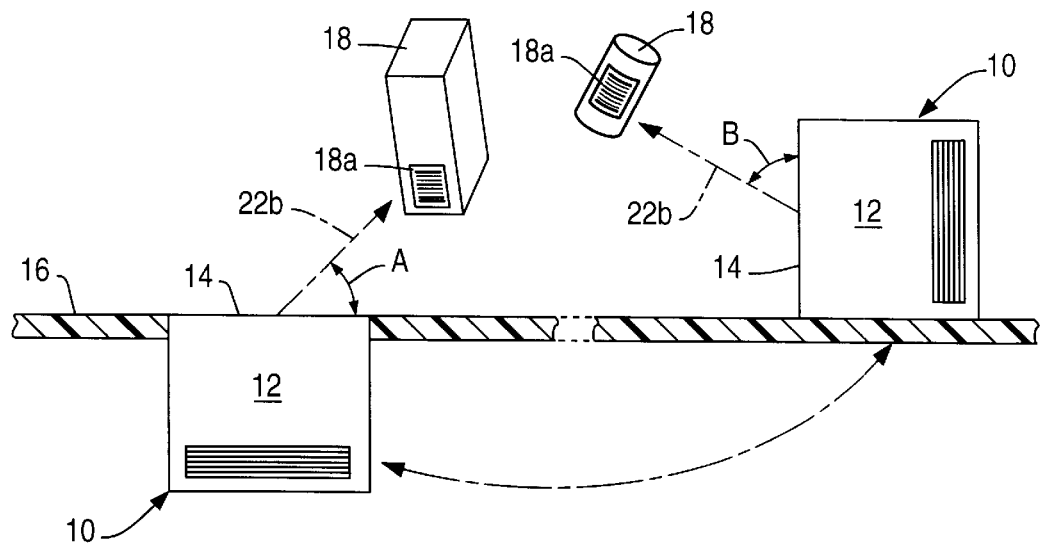
FIG. 2 is a side elevational view of the barcode scanner illustrated in FIG. 1 shown in alternate horizontal and vertical orientations.

Illustrated in two alternate positions in FIGS. 1 and 2 is a convertible barcode scanner 10 in accordance with a preferred embodiment of the present invention. The scanner 10 includes a suitable housing 12, having plastic walls for example, with a transparent glass window 14 suitably mounted therein. The same scanner may be mounted in a horizontal orientation with its window 14 being flat and flush to the top surface of a counter 16 for use as a pass-through scanner. In this orientation, an item or product 18 having a conventional barcode 18a thereon may be swept horizontally over the window so that the scanner 14 may read and decode the barcode 18a. The barcode 18a may take any conventional configuration such as the one dimensional UPC barcode typically found on supermarket products.

In accordance with a significant advantage of the present invention, the scanner 10 may alternatively be re-oriented into a vertical position with the window 14 being mounted perpendicularly to the countertop for use as a presentation scanner wherein the product 18 is presented in front of the vertical window 14 in a second orientation instead of over the horizontal window 14 in the first orientation.

Figure 3:
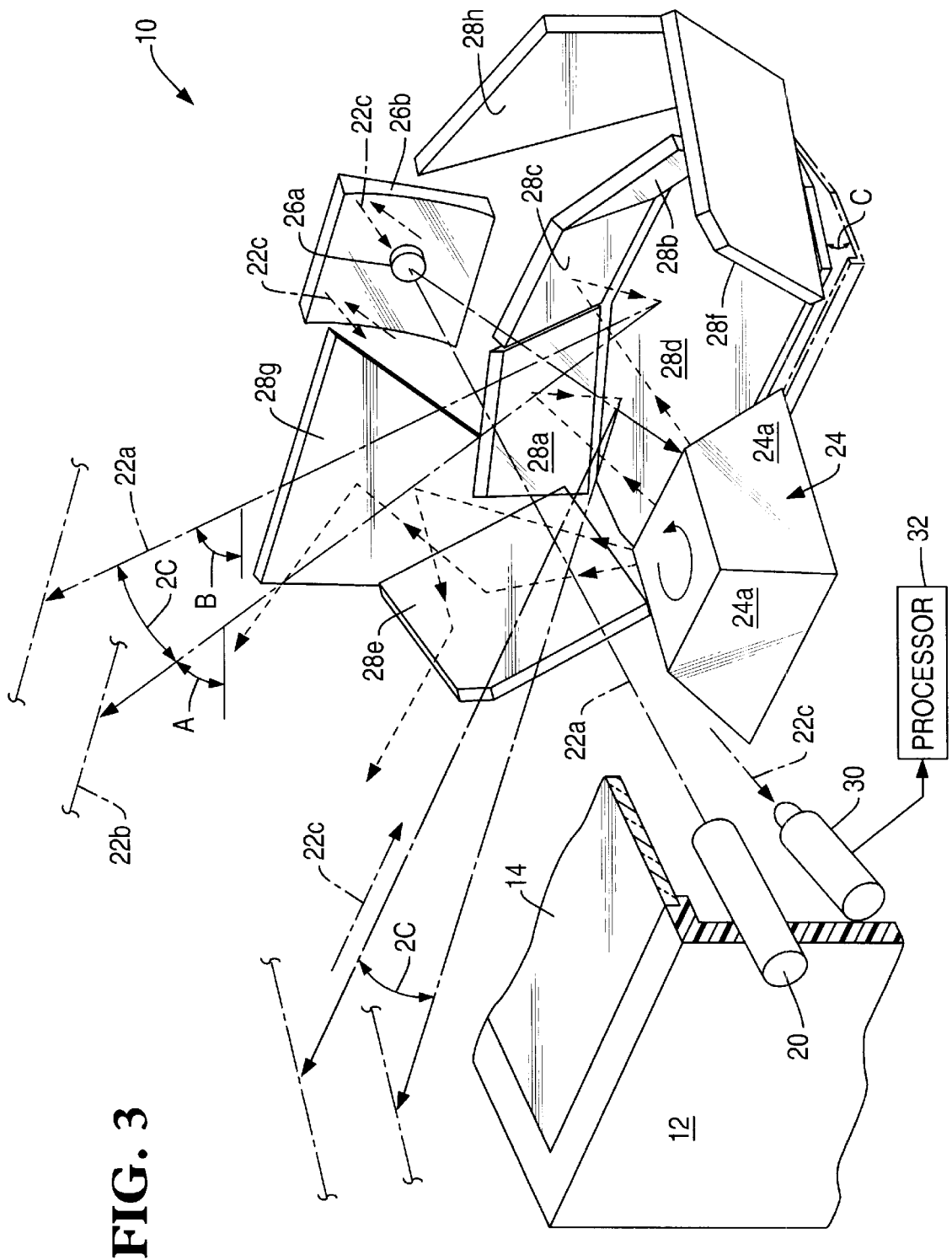
FIG. 3 is a schematic representation of a portion of the barcode scanner illustrated in FIG. 1 having a spinner and pattern mirrors arranged in a preferred embodiment of the present invention.

The working components of the scanner 10 are illustrated in more particularity in FIG. 3 and are suitably mounted inside the housing 12. A laser 20 is mounted in the housing 12 for producing a laser beam 22a. A spinner 24 includes a plurality of mirror facets 24a optically aligned with the laser 20 for receiving the laser beam 22a therefrom. In the exemplary embodiment illustrated in FIG. 3, a flat deflection mirror 26a is mounted on an opposite side of the spinner 24 in optical alignment with the laser 20 for reflecting the beam 22a against each of the spinner facets 24a in turn. The spinner 24 includes a suitable internal motor (not shown) which rotates the spinner 24 during operation.

A plurality of pattern mirrors 28a–h are optically aligned with the spinner 24 for reflecting the laser beam 22a therefrom to produce a first pattern of scan lines 22b which are transmitted or projected out the window 14 for use in reading the barcodes 18a illustrated in FIGS. 1 and 2. The pattern mirrors 28a–h may have any conventional configuration and orientation and typically cooperate with the rotating spinner 24 for reflecting the laser beam 22a therefrom in two reflections before exiting the window 14. The spinner 24 has four mirror facets 24a each at a different inclination angle for cooperating with the eight exemplary pattern mirrors 28 to produce four generally parallel sets of scan lines corresponding with each of the spinner facets 24a per revolution of the spinner 24. Some of the beam paths are illustrated in FIG. 3, with each path producing a corresponding one of the scan lines 22b which collectively produce the entire scan pattern per revolution of the spinner 24 during operation.

The scanner 10 illustrated in FIG. 3 also includes a collection mirror 26b which is typically concave and optically aligned with the spinner 24 for receiving a return beam 22c from the barcode 18a illustrated in FIG. 1 as one or more of the scan lines traverse the dark and light regions of the barcode. The collection mirror 26b is typically formed integrally with the deflection mirror 26a mounted at its center, with the assembly thereof also being referred to as a transceiver. The return beam 22c illustrated in FIG. 3 travels in a direction opposite to the projected laser beam 22a back through the window 14 to respective ones of the pattern mirrors 28a–h, and against the spinner 24 for reflection to the collection mirror 26b. Disposed adjacent to the laser 20 is a photodetector 30 optically aligned with the collection mirror 26b for detecting the return beam 22c therefrom. An electrical processor 32 is operatively joined by suitable electrical wires to the detector 30 for decoding the return beam 22c in a conventional manner.

In accordance with the present invention, a method is disclosed for converting the same barcode scanner 10 illustrated in FIGS. 1–3 to different orientations and use as either a horizontal, pass-through scanner or a vertical presentation scanner. In the former orientation, the scanner 10 is configured to produce or project the scan lines 22b out the window 14 at a first exit angle A measured relative to the flat surface thereof which may have a nominal midpoint scan angle of about 45° for example. Each of the several scan lines in the first pattern has a correspondingly different value of the first exit angle A which may vary plus or minus several degrees from the exit angle at the midpoint of the scan pattern.

With a mid point scan pattern exit angle A of about 45° from the window 14, the window 14 may be oriented horizontally and flush in the counter 16 as illustrated in FIG. 1 for maximizing efficiency in reading barcodes 18a swept over the window 14 in a pass-through application. The scanner 10 is simply converted in accordance with the present invention for projecting at least one of the scan lines 22b at a different second exit angle B as illustrated in FIGS. 1–3 through the window 14 which correspondingly produces a second pattern of the scan lines.

In the preferred embodiment, the second exit angle B, for the midpoint scan pattern for example, is greater than the first exit angle A, for the corresponding midpoint scan pattern. For example, for the first exit angle A of about 45°, the second exit angle B may be as close to 90° as practical, and in the exemplary embodiment illustrated in FIG. 3 may be about 60°, which is 15° greater than the first exit angle A.

The difference in the first and second exit angles may be readily effected in accordance with the present invention by simply tilting a suitable one of the pattern mirrors to change the reflection angle of the laser beam thereon to change from the first exit angle A to the second exit angle B. The so tilted pattern mirror is designated the diverting pattern mirror, and suitable tilting may be effected by pivoting the diverting mirror about one end thereof to change its tilt in the housing, which correspondingly changes the reflection angle of the laser beam 22a thereon.

As illustrated in FIG. 3, the pattern mirrors 28a–h may be arranged in a first group of three pattern mirrors 28a–c optically aligned with a common floor mirror 28d which is the exemplary pattern mirror defining the diverting mirror which is shown in phantom line in a first or lower position to effect the first exit angle A, and in solid line in a second or upper position to effect the larger second exit angle B. As the spinner 24 rotates during operation, the laser beam 22a is reflected in turn firstly off the three pattern mirrors 28a–c and secondly off the common floor mirror 28d which then projects the laser beam out the window 14 for a portion of the first pattern which is twelve corresponding scan lines thereof. A second or remaining group of four of the pattern mirrors 28e–h are not optically aligned with the floor mirror 28d, but instead receive the laser beam 22a from the rotating spinner 24 and directly reflect the beam out the window 14 to project the remaining portion of the first pattern.

As shown in FIG. 3, the eight pattern mirrors 28a–h are symmetrically oriented relative to the rotating spinner 24 in a conventional configuration as found in U.S. Pat. No. 5,591,954 introduced above. With the floor mirror 28d positioned in the lower position illustrated in FIG. 3, substantially the same scan pattern shown in that patent may be produced. However, in that patent, the floor mirror is fixed in a single position. In accordance with the present invention, by simply changing the tilt orientation of the floor mirror 28d from its lower position illustrated in FIG. 3 to its upper position through a corresponding tilt angle C at least one and preferably a sub-set of the scan lines may be projected with the greater exit angle B.

In the exemplary embodiment illustrated in FIG. 3, the common floor mirror 28d cooperates with the first group of three pattern mirrors 28a–c to produce twelve of the total scan lines in the first pattern per revolution of the spinner 24. By changing the tilt angle of the floor mirror 28d the corresponding exit angles of the twelve scan lines may be increased. The resulting second pattern of scan lines projected out the window 14 will therefore differ at least in part from the first pattern corresponding with the twelve affected scan lines produced by the three pattern mirrors 28a–c. The remaining portion of the second pattern produced by the four pattern mirrors 28e–h will therefore be identical with those in the original first pattern.

In this way, a portion of the first pattern produced with the floor mirror 28d in its lower position is shifted slightly when the corresponding exit angles are increased when the floor mirror 28d is tilted to its upper position through the tilt angle C. The twelve shifted scan lines are also concentrated within the second pattern providing more scan lines in a given area than in the first pattern to improve presentation scanning performance.

With the floor mirror 28d oriented in its lower position as illustrated in phantom in FIG. 3, the scanner 10 may be used in the horizontal, pass-through orientation illustrated in FIG. 1 with the window 14 being mounted horizontally, and the floor mirror 28d effecting the first exit angle A. By simply tilting the floor mirror 28d through the tilt angle C to its upper position illustrated in FIG. 3 to effect the second exit angle B, the scanner 10 illustrated in solid line in FIG. 1 may be used in its vertical, presentation orientation with the window 14 being mounted vertically atop the counter 16. The increased exit angle B improves the efficiency and accuracy of reading the barcodes 18a in the presentation orientation of the scanner 10 illustrated in FIG. 1. Correspondingly, in the pass-through orientation of the scanner 10 illustrated in FIG. 1, the smaller first exit angle A is desired for maximizing efficiency and effectiveness.

But for the present invention, the scanner 10 illustrated in FIG. 3 may be otherwise conventional in configuration and operation such as that disclosed in the patent identified above. Since this exemplary patented scanner has been in commercial use for many years in a specific design, suitable modifications thereof may be readily effected with few changes for incorporating the pivoting floor mirror 28d used in the improvement illustrated in FIG. 3.

However, the available space in this pre-existing design is limited, which therefore limits the amount of the tilt angle C for the floor mirror 28d to about 7½ which in turn will change the first and second exit angles A,B by twice this value, i.e. 2C, which corresponds with 15° of exit angle variation. In an alternate design not having such structural restrictions, the amount of tilt of the floor mirror 28d may be selected as desired for achieving a nominal 90° exit angle B where practical in the presentation orientation of the scanner.

Figure 4:
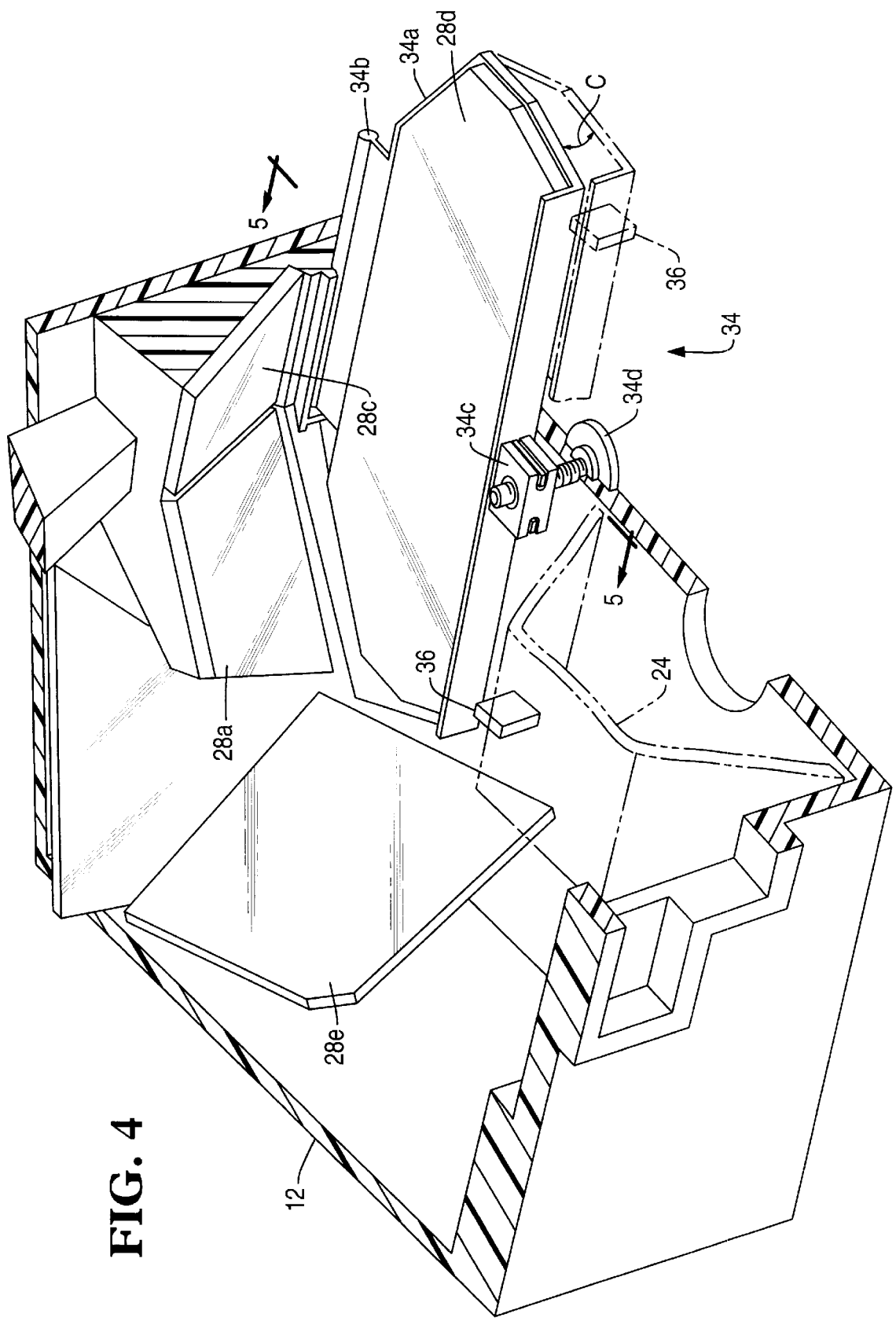
FIG. 4 is a partly sectional, isometric view of a portion of the scanner illustrated in FIG. 3 showing a floor mirror with adjustable tilt for changing exit angle of the scan pattern projected from the scanner in accordance with an exemplary embodiment of the present invention.
Figure 5:
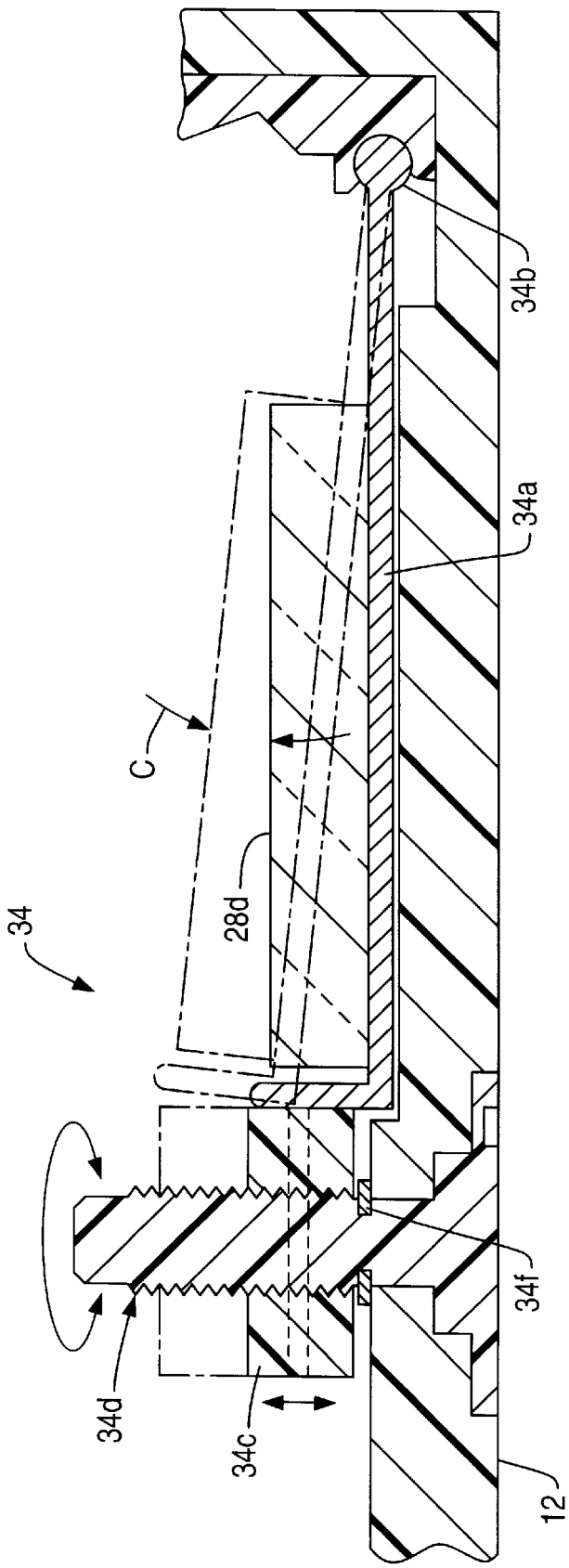
FIG. 5 is an elevational sectional view through the floor mirror illustrated in FIG. 4 in a housing and taken generally along line 5—5.
Figure 6:
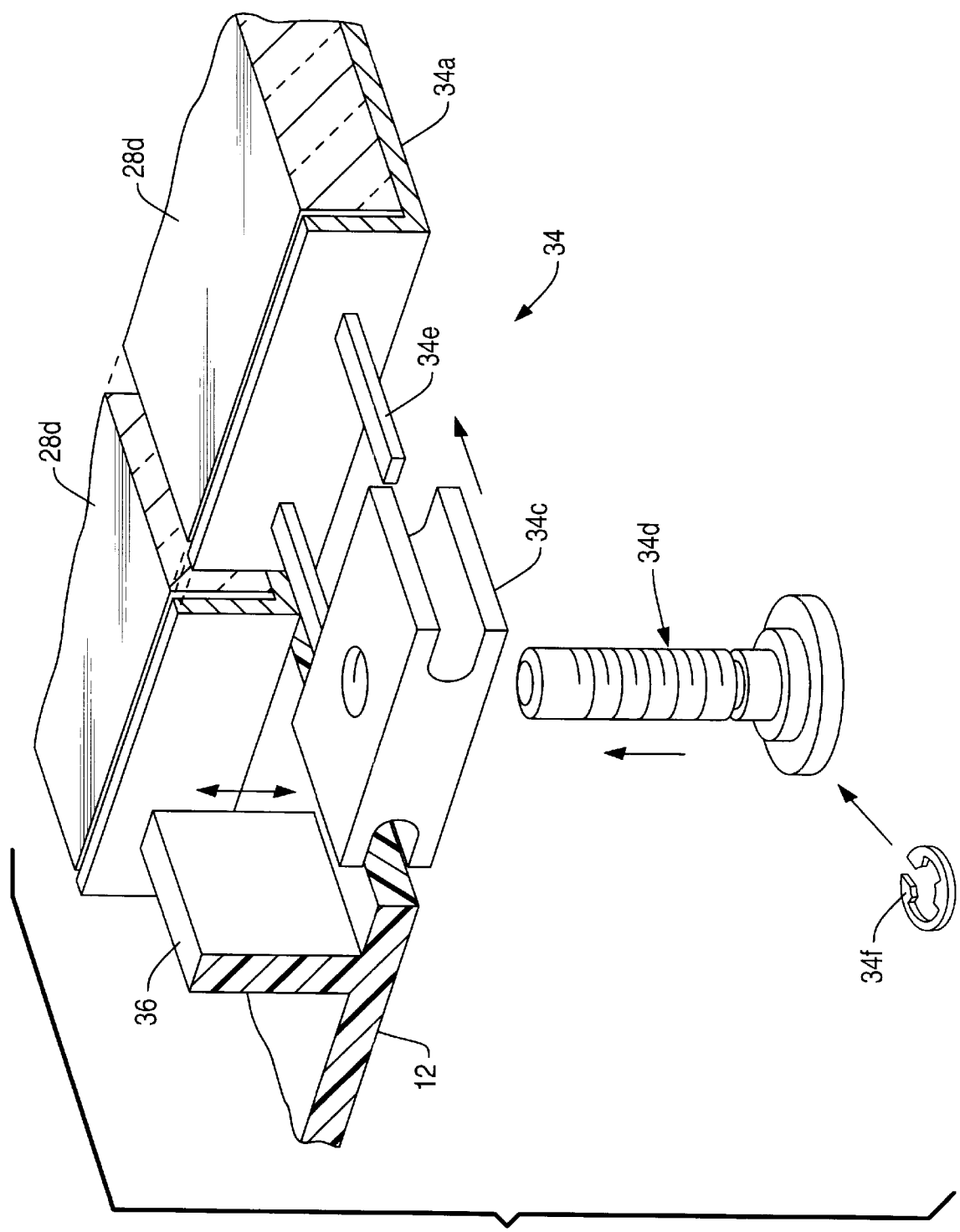
FIG. 6 is an exploded view of the front portion of a conversion mount supporting the floor mirror illustrated in FIG. 5 for changing tilt thereof in accordance with an exemplary embodiment.

Various means may be used for mounting the floor mirror 28d illustrated in FIG. 3 for undergoing change in tilt angle as required for changing the corresponding exit angles of the scan lines through the window 14. FIGS. 4–6 illustrate a preferred embodiment of means in the form of a conversion mount 34 which is an assembly of components for adjustably supporting in the housing 12 the floor mirror 28d in different tilt orientations for changing the reflection angle thereon and correspondingly changing at least one of the scan lines from the first exit angle A to the different and preferably larger second exit angle B. Correspondingly, the second scan pattern varies in part from the original first pattern.

In the exemplary embodiment illustrated in FIG. 4, the conversion mount 34 includes a flat mounting plate 34a, which may be metal for example, on which the floor mirror 28d is suitably attached by an adhesive for example. The conversion mount 34 also includes a rear hinge 34b which pivotally mounts the mounting plate 34a and the floor mirror 28d thereon to a portion of the housing 12 at its floor. The hinge 34b may be defined by a cylindrical back edge of the mounting plate 34a which is disposed in a complementary concave mating socket formed within a portion of the housing 12, or in a separate frame attached thereto as illustrated in more particularity in FIG. 5.

A block or fitting 34c as illustrated in FIGS. 4 and 6 adjoins the front edge of the floor mirror 28d opposite to the hinge 34b, and an adjustable fastener or screw 34d extends through the base of the housing 12 and through the fitting 34c to adjustably swing or pivot the floor mirror 28d about the rear hinge 34b to tilt the floor mirror 28d through the tilt angle C and in turn change the reflection angle atop the floor mirror 28d.

As shown in more detail in FIG. 6, the front edge of the mounting plate 34a defines a generally L-shaped flange from which extends forwardly a fork 34e defined by a pair of straight rails formed integrally with the mounting plate 34a. The fitting 34c correspondingly includes a pair of side slots configured and sized for slidingly receiving the fork 34e during assembly.

The cooperating fastener 34d as illustrated in FIG. 6 includes a head for turning the fastener, a shank attached to the head and extending through a corresponding hole in the bottom of the housing 12, and a threaded portion above the shank which threadingly engages a center hole in the fitting 34c for raising and lowering the fitting 34c and attached mounting plate 34a upon rotation thereof. The shank of the fastener 34d as illustrated in FIGS. 5 and 6 includes a groove in which is mounted a conventional C-clip 34f which traps or retains the fastener 34d in its mounting hole in the bottom of the housing 12. The fastener 34d may be nylon plastic, and the C-clip 34f may be metal.

The head of the fastener 34d may have any suitable feature such as a recess therein which may be used to manually rotate the fastener to screw the threaded portion thereof through the fitting 34c. As shown in FIG. 5, clockwise rotation of the fastener 34d will in turn lower the fitting 34c and the attached mounting plate and floor mirror, whereas counterclockwise rotation of the fastener 34d will elevate the fitting 34c and the attached mounting plate and floor mirror at their front edges. Since the back edge of the mounting plate 34a is attached in the housing socket defining the hinge 34b, raising and lowering the front edge of the mounting plate correspondingly pivots or tilts the mounting plate and attached floor mirror 28d in a relatively simple arrangement.

In order to improve the accuracy of positioning the floor mirror 28d, a pair of laterally spaced apart friction blocks 36, shown in FIGS. 4 and 6, are joined to the floor of the housing 12 and extend vertically upwardly adjacent to the front edge of the mounting plate 34a for frictional engagement therewith. The blocks 36 may be plastic like the housing 12 from which they extend and may have sufficient resiliency for effecting a friction force along the front edge of the mounting plate 34a. Accordingly, as the fastener 34d is turned for repositioning the floor mirror 28d, the front edge of the mounting plate 34a frictionally engages the blocks 36 for eliminating excessive movement thereof during operation.

In the preferred embodiment illustrated in FIG. 5, the floor of the housing 12 includes a suitable recess for receiving the mounting plate 34a substantially flush therein so that in its lowered position, the floor mirror 28d is positioned in the same orientation as in the conventional scanner over which the present invention is an improvement. In this lower position, the floor mirror cooperates with the pattern mirrors to produce the same scan pattern found in the original scanner. In the upper position, the tilted floor mirror produces the desired change in scan pattern exit angle which improves performance of the original scanner in the presentation application.

The so improved scanner 10 may therefore perform identically with a proven scanner design when used in the horizontal, pass-through orientation illustrated in FIG. 1. However, by simply rotating the fastener 34d counterclockwise, the floor mirror 38d may be tilted through the tilt angle C to its upper position which reconfigures the scanner 10 for use in the vertical, presentation orientation illustrated in FIG. 1. In this way, with a simple manual modification of the position of the floor mirror 28d, the same scanner 10 may be used in two different orientations with correspondingly different exit angles A,B and correspondingly different scan patterns therefrom. This reduces or eliminates the need to manufacture differently configured scanners for the separate pass-through and presentation orientations, which saves substantial cost in manufacturing and use in the industry.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A convertible barcode scanner comprising:

a housing having a window;

a laser mounted in said housing for producing a laser beam;

a spinner having a plurality of mirror facets optically aligned with said laser for receiving said beam;

a plurality of pattern mirrors aligned in optical series with said spinner for reflecting said beam therefrom to project a first pattern of scan lines out said window at a first exit angle; and a conversion mount for adjustably supporting a diverting one of said pattern mirrors in different tilt orientations in said housing for changing reflection angle thereon and correspondingly changing at least one of said scan lines from said first exit angle to a different second exit angle.

2. A scanner according to claim 1 wherein said conversion mount comprises:

a hinge pivotally mounting said diverting mirror at one end to said housing;

a fitting adjoining said diverting mirror at an opposite end; and an adjustable fastener extending through said housing and said fitting to adjustably pivot said diverting mirror about said hinge to tilt said diverting mirror.

3. A scanner according to claim 2 wherein said conversion mount further comprises:

a mounting plate having front and back opposite edges, and said diverting mirror is attached therebetween;

said back edge being pivotally joined in a mating socket to define said hinge; and said front edge including a fork slidingly receiving said fitting.

4. A scanner according to claim 3 further comprising a pair of spaced apart friction blocks joined to said housing adjacent said mounting plate for frictional engagement therewith.

5. A scanner according to claim 3 wherein said fastener threadingly engages said fitting for raising and lowering said fitting and attached plate upon rotation thereof to tilt said diverting mirror.

6. A scanner according to claim 2 wherein said pattern mirrors comprise:

a first group of pattern mirrors optically aligned with a common floor mirror defining said diverting mirror to project a portion of said first pattern; and a second group of pattern mirrors not optically aligned with said floor mirror to project a remaining portion of said first pattern.

7. A scanner according to claim 6 further comprising:

a collection mirror optically aligned with said spinner for receiving a return beam;

a detector optically aligned with said collection mirror for receiving said return beam; and a processor operatively joined to said detector for decoding said return beam.

8. A scanner according to claim 6 wherein said second exit angle is greater than said first exit angle.

9. For a barcode scanner having a laser, spinner, and pattern mirrors aligned in optical series with said spinner for reflecting a beam from said laser off said spinner and mirrors to project a first pattern of scan lines out a window at a first exit angle, a method of converting said barcode scanner to project at least one of said scan lines at a different second exit angle through said window, comprising:

tilting a diverting one of said pattern mirrors to change reflection angle thereon to effect said second exit angle.

10. A scanner according to claim 1 wherein said pattern mirrors comprise a group thereof optically aligned in parallel with said diverting mirror in optical series therewith in turn from said spinner.

11. A scanner according to claim 10 wherein said pattern mirror group is optically aligned firstly with said spinner, and said diverting mirror is optically aligned with said group secondly from said spinner.

12. A method according to claim 9 further comprising pivoting said diverting mirror about one end thereof to tilt said diverting mirror.

13. A method according to claim 12 further comprising projecting a second pattern of scan lines out said window differing at least in part from said first pattern.

14. A method according to claim 13 further comprising projecting said second pattern of scan lines out said window being identical in part with said first pattern.

15. A method according to claim 12 further comprising:

projecting a portion of said first pattern from a first group of pattern mirrors optically aligned with a common floor mirror defining said diverting mirror; and projecting a remaining portion of said first pattern from a second group of pattern mirrors not optically aligned with said floor mirror.

16. A method according to claim 15 wherein:

said second exit angle is greater than said first exit angle;

said window is mounted horizontally when said floor mirror is positioned to effect said first exit angle; and said window is mounted vertically when said floor mirror is tilted to effect said second exit angle.

17. A method according to claim 9 further comprising:

mounting said window horizontally with said diverting mirror being positioned to effect said first angle.

18. A method according to claim 17 further comprising:

pivoting said diverting mirror to effect said first exit angle of about 45°.

19. A method according to claim 9 further comprising:

mounting said window vertically with said diverting mirror being positioned to effect said second angle.

20. A method according to claim 19 further comprising:

pivoting said diverting mirror to effect said second exit angle of about 90°.

* * * * *